(12) United States Patent
De Francesco

(10) Patent No.: US 8,210,259 B2
(45) Date of Patent: Jul. 3, 2012

(54) ZERO EMISSION LIQUID FUEL PRODUCTION BY OXYGEN INJECTION

(75) Inventor: Errico De Francesco, Paris (FR)

(73) Assignee: American Air Liquide, Inc., Fremont, CA (US)

( * ) Notice: Subject to any disclaimer, the term of this patent is extended or adjusted under 35 U.S.C. 154(b) by 306 days.

(21) Appl. No.: 12/429,250

(22) Filed: Apr. 24, 2009

(65) Prior Publication Data
US 2009/0266540 A1  Oct. 29, 2009

Related U.S. Application Data

(60) Provisional application No. 61/048,673, filed on Apr. 29, 2008.

(51) Int. Cl.
*E21B 43/243* (2006.01)
*E21B 43/40* (2006.01)

(52) U.S. Cl. ...... 166/261; 166/266; 166/267; 166/272.1

(58) Field of Classification Search .................. 166/256, 166/261
See application file for complete search history.

(56) References Cited

U.S. PATENT DOCUMENTS

| | | | | |
|---|---|---|---|---|
| 4,026,357 A * | 5/1977 | Redford | ................ | 166/261 |
| 4,410,042 A * | 10/1983 | Shu | ................ | 166/261 |
| 4,415,031 A * | 11/1983 | Hunt, III | ................ | 166/261 |
| 4,454,916 A | 6/1984 | Shu | | |
| 4,474,237 A * | 10/1984 | Shu | ................ | 166/261 |
| 4,476,927 A * | 10/1984 | Riggs | ................ | 166/261 |
| 4,552,216 A * | 11/1985 | Wilson | ................ | 166/261 |
| 4,649,997 A * | 3/1987 | Bousaid | ................ | 166/261 |
| 4,662,443 A * | 5/1987 | Puri et al. | ................ | 166/261 |
| 7,654,320 B2 * | 2/2010 | Payton | ................ | 166/257 |
| 7,882,893 B2 * | 2/2011 | Fraim | ................ | 166/260 |
| 2006/0207762 A1 * | 9/2006 | Ayasse | ................ | 166/261 |
| 2006/0243448 A1 | 11/2006 | Kresnyak et al. | | |
| 2009/0071648 A1 * | 3/2009 | Hagen et al. | ................ | 166/272.1 |
| 2010/0077752 A1 * | 4/2010 | Papile | ................ | 60/641.8 |

FOREIGN PATENT DOCUMENTS

| | | |
|---|---|---|
| CA | 1113379 | 12/1981 |
| CA | 1113380 | 12/1981 |
| CA | 1136867 | 12/1982 |
| CA | 1144474 | 4/1983 |
| CA | 1161259 | 1/1984 |
| CA | 1196855 | 11/1985 |
| CA | 1197178 | 11/1985 |
| CA | 1197179 | 11/1985 |
| CA | 1197455 | 12/1985 |
| WO | 2007090275 | 8/2007 |
| WO | 2007095764 | 8/2007 |

* cited by examiner

*Primary Examiner* — George Suchfield
(74) *Attorney, Agent, or Firm* — Elwood L. Haynes

(57) ABSTRACT

An enhanced oil recovery method is provided. This method includes; introducing a first essentially pure oxygen stream into a subterranean hydrocarbon-bearing formation traversed by at least one injection well and at least one production well, and initiating and sustaining in-situ combustion in the vicinity of the injection well. This method also includes introducing a second essentially pure oxygen stream and a hydrocarbon-containing fuel gas stream into the combustion device of a power generation system, wherein the combustion device produces an exhaust gas stream comprising water and carbon dioxide. This method also includes separating the exhaust gas stream into a stream of essentially pure water, and a stream of essentially pure carbon dioxide, and introducing at least a portion of the essentially pure carbon dioxide stream into the subterranean hydrocarbon-bearing formation prior to initiating the in-situ combustion. The method may be used on a structure containing a carbonaceous substance such as coal, petcoke, or biomass.

5 Claims, 2 Drawing Sheets

ZERO EMISSION LIQUID FUEL PRODUCTION BY OXYGEN INJECTION

The present application claims the benefit of U.S. Provisional Application Ser. No. 61/048,673, filed Apr. 29, 2008, herein incorporated by reference in its entirety for all purposes.

BACKGROUND

Since 2002, there has been a general trend of increasing oil prices. This trend is generally expected to continue as a result of a number of factors: increasing oil demand from emerging economies; geopolitical instability in important production areas; and reduced exploration and technological development within the last two decades due to low oil prices.

Current oil prices, along with international regulations on CO2 emissions (such as the Kyoto Protocol and beyond, Alberta "carbon tax", California regulation on GHG footprint of fossil fuels, etc.) increases the industries interest in providing innovative solutions that will allow: the increase of oil recovery from a given existing reservoir at a reduced additional cost; reliable performance within a large range of oil/reservoir characteristics; and the reduction of carbon footprint of technologies for enhanced oil recovery.

The techniques to be employed for oil recovery depend on the particular geological conditions (thin reservoirs . . . , porous reservoirs . . . ) and are typically performed at different stages of the oil production.

The term Primary Recovery Technologies includes recovery strategies using the natural energy of reservoirs. These technologies are based on the immiscible fluids displacement, and different mechanisms are possible, such as: Gas Cap drive (expansion of the gas phase); Solution Gas Drive (ex-solution of solved Gas); Bottom Water Drive (aquifer displacement). For conventional oil typical performance for primary recovery techniques are around 19% of OOIP (Original Oil in Place): less for heavy oils, more for light oils.

In the Secondary Recovery, also known as water-flooding, the enhancement of oil production is performed by adding energy to the natural system. Water is typically injected in a well (or a pattern of wells) in order to maintain pressure in the reservoir and to displace oil towards a producer. Initially oil alone is produced. Then as water component progresses, both oil and water are produced. As time advances, the percentage of water (the watercut) increases progressively. For conventional oil, average recovery by Water Flooding is around 32% OIP (Oil In Place) after primary recovery.

Enhanced Oil Recovery (EOR) techniques are used to further increase the amount of recovered oil, in particular when water-flooding is not effective (or efficient). Some of the various EOR techniques that may be employed include: thermal-based oil recovery: steam flooding, cyclic thermal injection, in-situ combustion; electric heating, microwaves heating; chemical flooding: polymer flooding, micellar flooding; Immiscible Flooding: Nitrogen injection, CO2 injection; Miscible Flooding: lean gas injection, CO2 injection; and microbial injection.

For conventional oil, primary recovery is usually followed by water-flooding, but most of the enhanced oil technologies are not yet commercially proven. For unconventional oil reserves such as extra heavy oil in Venezuela and Albertan oil sands (characterized by high densities and high viscosities (20>API>7, 10000 cPo<m<100 cPo or 12>API<7, m>10000 cPo) primary and secondary recovery are not sufficient to guarantee oil production and the economic exploitation of these resources is strictly related to the successful development of EOR technologies. The growing relevance of heavy oils in the world oil reserves and in particular of such unconventional oils results in the development of new EOR methods.

The SAGD (Steam Assisted Gravity Drainage) is a steam flooding technique improved by the use of two horizontal wells: one for steam injection and one for bitumen extraction. The steam heats the formation increasing the viscosity of bitumen which can flow trough the producer. The main drawback of SAGD concerns high SOR (steam on oil ratio), ranging from 2 to 4. The performance of SAGD are strictly dependent upon reservoir properties. Characteristics such gas caps, aquifers, and shale in the reservoir can result in uneconomical operations.

Steam flooding and SAGD are typically only efficient for shallow reservoirs (<1000 m) thus not being a viable solution for heavy oil resources in area such as the Arabic gulf and Russia.

The VAPEX (Vapor Extraction) process involves injecting a gaseous hydrocarbon solvent into the reservoir where it dissolves into the bitumen. The bitumen then becomes less viscous and can drain into a lower horizontal well and be extracted. The solvent is typically propane, butane, or CO2 along with a carrier gas. Main drawbacks of this technique are the following. In the case of bitumen or extra heavy oil, blending oil with the solvent without heating the formation produces only small improvements in oil recovery. Solvent is also expensive, can be scarce, and therefore the losses in the reservoir can be important.

A number of process such as ES-SAGD, LASER or SAVEX are under development in order to provide an hybrid in-situ extraction technology coupling the advantages of steam injection (thermal reduction of oil viscosity) and solvent injection. Lights hydrocarbons are used and solutions to drawbacks such as reservoir depressurization and solvent losses have to be developed. None of these combine the advantages of thermal extraction and miscible and immiscible flooding.

The In-Situ Combustion (ISC) process is defined as "the propagation of a high temperature front for which the fuel is a coke-like substance, laid down by thermal cracking reactions". In recent years, that has been a worldwide interest of ISC for conventional oil.

Compared to mining, SAGD and VAPEX, in-situ combustion based bitumen extraction has the potential to be applied in a wider range of reservoir characteristics and to provide partially upgraded bitumen with better thermal efficiency and reduced environmental impact: Benefits of ISC include: reduced GHG footprint—50% less than SAGD; almost no water consumption; no need for land remediation. Within the ISC, bitumen is partially upgraded in the underground, and the production is performed by thermal flooding (viscosity reduction) and gas flooding (flue gas drive).

The use of oxygen injection represents one of the main areas of development for this technology. Advantages of oxygen injection for In-Situ combustion operations include: lower compression cost; simple ignition; better thermal efficiency: produced heat is not dispersed trough an inert gas; and easier downstream operations: emulsions are easy to break. Additionally, as in the case of surface oxy-combustion, the use of oxygen will result in the possibility of recovering a CO2-rich stream at the production well, to be used for additional EOR and storage. However, low oil prices and lack of GHG emissions regulations have not justified the use of oxygen in the last twenty years.

There is a need in society for an in-situ combustion oil recovery process that will improve the economics, improve the oil recovery, reduce the environmental impact, and improve safety.

SUMMARY

The present invention is an enhanced oil recovery method that includes; introducing a first essentially pure oxygen stream into a subterranean hydrocarbon-bearing formation traversed by at least one injection well and at least one production well, and initiating and sustaining in-situ combustion in the vicinity of said injection well. The present invention also includes introducing a second essentially pure oxygen stream and a hydrocarbon-containing fuel gas stream into the combustion device of a power generation system, wherein said combustion device produces an exhaust gas stream comprising water and carbon dioxide. The present invention also includes separating said exhaust gas stream into a stream of essentially pure water, and a stream of essentially pure carbon dioxide, and introducing at least a portion of said essentially pure carbon dioxide stream into said subterranean hydrocarbon-bearing formation prior to initiating said in-situ combustion.

BRIEF DESCRIPTION OF DRAWINGS

The invention may be understood by reference to the following description taken in conjunction with the accompanying drawings, and in which.

DESCRIPTION OF PREFERRED EMBODIMENTS

The present invention is the design of an improved process for enhanced oil recovery based on in-situ combustion. The present invention provides improved economics due to reduced compression costs, the virtual elimination of N2 in the combustion exhaust, and the reduction of O2 requirements. The present invention also provides improved ultimate oil recovery from oil reservoirs, by combining in-situ combustion and CO2 flooding. The present invention provides the dramatic reduction of the environmental footprint of oil recovery technologies, with virtually zero CO2 emissions, and virtually no water being used. The present invention provides improved safety, with CO2 being injected for O2 dilution.

The present invention accomplishes this by integrating Oxygen-based in situ combustion for oil recovery, oxycombustion for power-energy production, and CO2-flooding.

In one aspect of the present invention, oil production is performed by O2-based in-situ combustion. In-situ combustion off-gas separation is performed in order to recover a CO2 stream and a fuel gas stream (comprising primarily light hydrocarbons, CO, and H2). The CO2 is compressed and can be either; partially recycled to the injection well (to improve sweep efficiency and High temperature front displacement); or partially sent to a pipe and used for EOR, ECBM, or storage. The oxycombustion water is used for additional injection, wet in-situ combustion. The fuel gas is blended with an additional fuel such as Natural Gas and oxy-burned in order to provide power for the compression of CO2 (for example re-injection, pipeline, etc.).

The present invention of the integration of oxy-combustion within O2-based in-situ combustion provides improved performance of the in-situ combustion process. This is accomplished by the recovery of a high LHV fuel gas, essentially nitrogen free, in order to reduce NG needs. This is also accomplished by the production of a concentrated CO2 stream as the only gaseous by-product of the process. This results in: the dramatic reduction of the environmental impact of oil upstream operations (zero GHG emissions, reduced water needs); the enhancement of oil recovery performance; and the availability on the oilfield for additional oil recovery.

Figure 1:
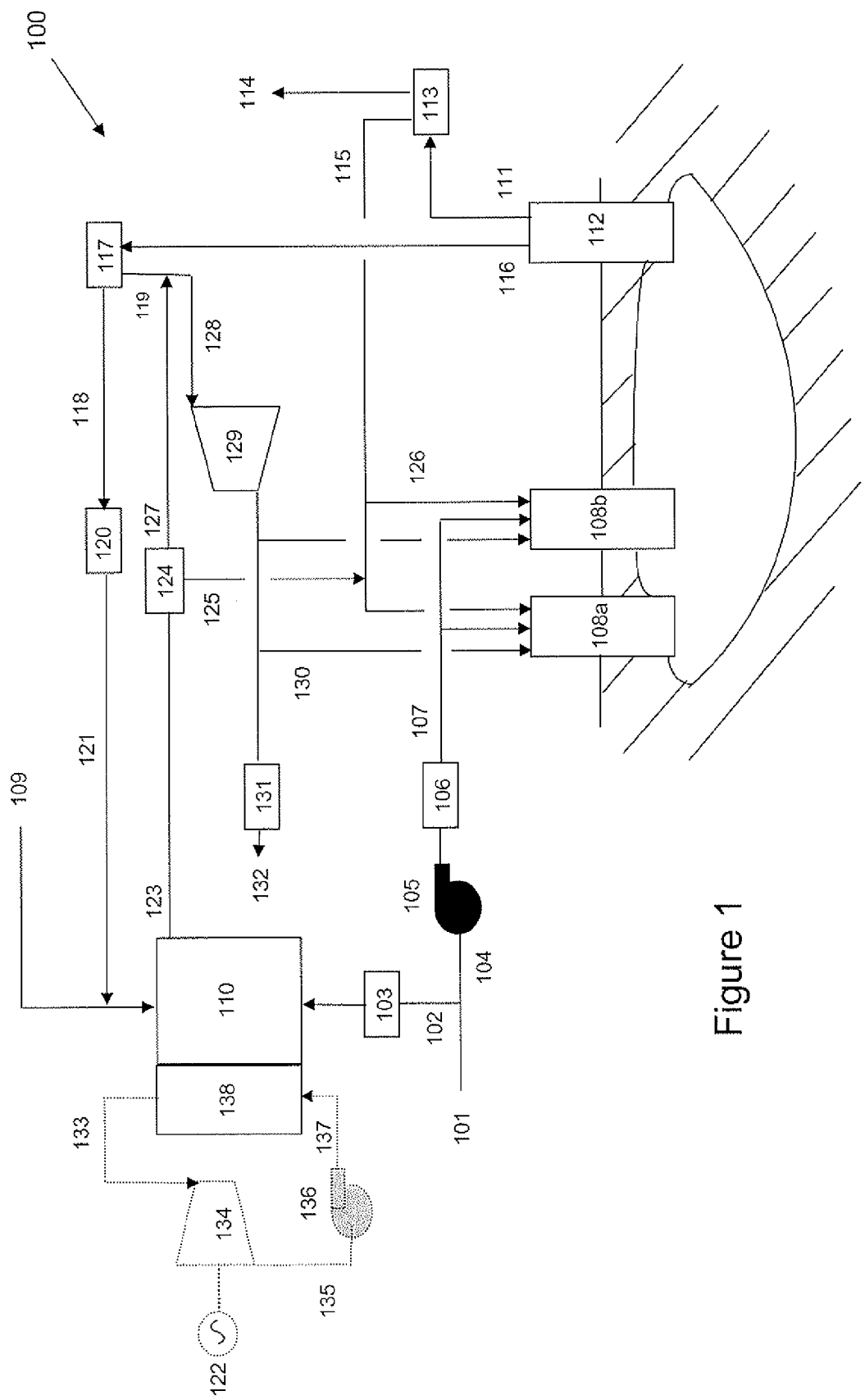
FIG. 1 is a schematic representation of one embodiment of the present invention, with a steam turbine for energy production.

Turning now to FIG. 1, enhanced oil recovery system 100 is provided. Essentially pure liquid oxygen stream 101 is introduced and at least part of the oxygen is directed into stream 102 is vaporized in vaporizer 103 then into oxy-combustion boiler 110. At least part of the oxygen is directed into stream 104, is increased in pressure in pump 105, and vaporized in vaporizer 106. The pressurized and vaporized oxygen 107 is then injected into the oil reservoir through an injection well 108a/108b in order to support in-situ combustion. The pressure at which the vaporized oxygen is introduced into the reservoir may be between about 50% and about 80% of the breakdown pressure. A blended stream 11, containing at least oil, gas and water, is recovered from production well 112

In another embodiment, the pressurized and vaporized oxygen 107 is injected into a structure containing a carbonaceous substance such as coal, petroleum coke (petcoke), or biomass, through at least one inlet line 108a/108b. A blended stream 111, containing at least oil, gas and water, is recovered from at least one outlet line 112.

This blended stream is separated in separator 113, thereby producing recovered oil stream 114, and separated water stream 115. Separated water stream 115 may be used as water injection into injection well 108a/108b. Recovered gas 116, which may include CO2, CO, H20, CH4, light hydrocarbons, H2, and H2S, is introduced to separator 117. The exact composition of the recovered gas will depend on the nature of the produced oil and the recovery process itself. The recovered gas will be substantially free of nitrogen, due to the oxygen injection. Separator 117 may include, but is not limited to, the following processes: adsorption, absorption, cryogenic systems and membrane systems. The adsorption systems may include, but are not limited to, Rectisol, Selexol, or Amine wash systems. In one embodiment, the membrane system or the combination of cryogenics and membrane system is preferred. A high LHV fuel gas 118, and a stream that is predominantly composed of CO2 119 are recovered from separator 117. The high LHV fuel gas 118 may optionally be is further purified in gas purification unit 120. The purified high LHV gas 121 may be combined with natural gas stream 109, prior to admission to combustion device 110.

After combusting the oxygen stream 102 with the fuel gas streams (109, 121), combustion device 110 outputs power 122 to the process (compression) facility, and also outputs an exhaust stream 123 that is predominantly H2O and CO2. Impurities may include predominantly SOx, NOx and Oxygen. Exhaust stream 123 enters separator 124, which outputs H20 stream 125 and CO2 stream 127. The H2O stream 125 is then combined with water stream 115, thereby producing combined stream 126. Additives can be used in order to control PH Stream Streams 125 and 126.

126 is then admitted into injection well 108a/108b. CO2 stream 127 is then combined with CO2 stream 119, thereby producing combined stream 128 which is partially purified, and introduced into compressor 129. At least part of the compressed CO2 130 is admitted into injection well 108a/108b. If any CO2 remains, it may be further purified in purifier 131, then sent to storage, to a local pipeline, or used for EOR 132.

In one embodiment, a Rankine cycle may be employed as follows. Combustion device 110 may be thermally linked to a steam generation device 138. Steam generation device 138 may produce steam stream 133, which is introduced into steam turbine 134. Steam turbine 134 produces power 122 and outputs lower pressure steam. This low pressure steam may be condensed, thereby producing condensate stream 135. Condensate stream 135 may be introduced to pump 136, thereby producing higher pressure condensate stream 137 which is returned to the steam generation device 138.

Figure 2:
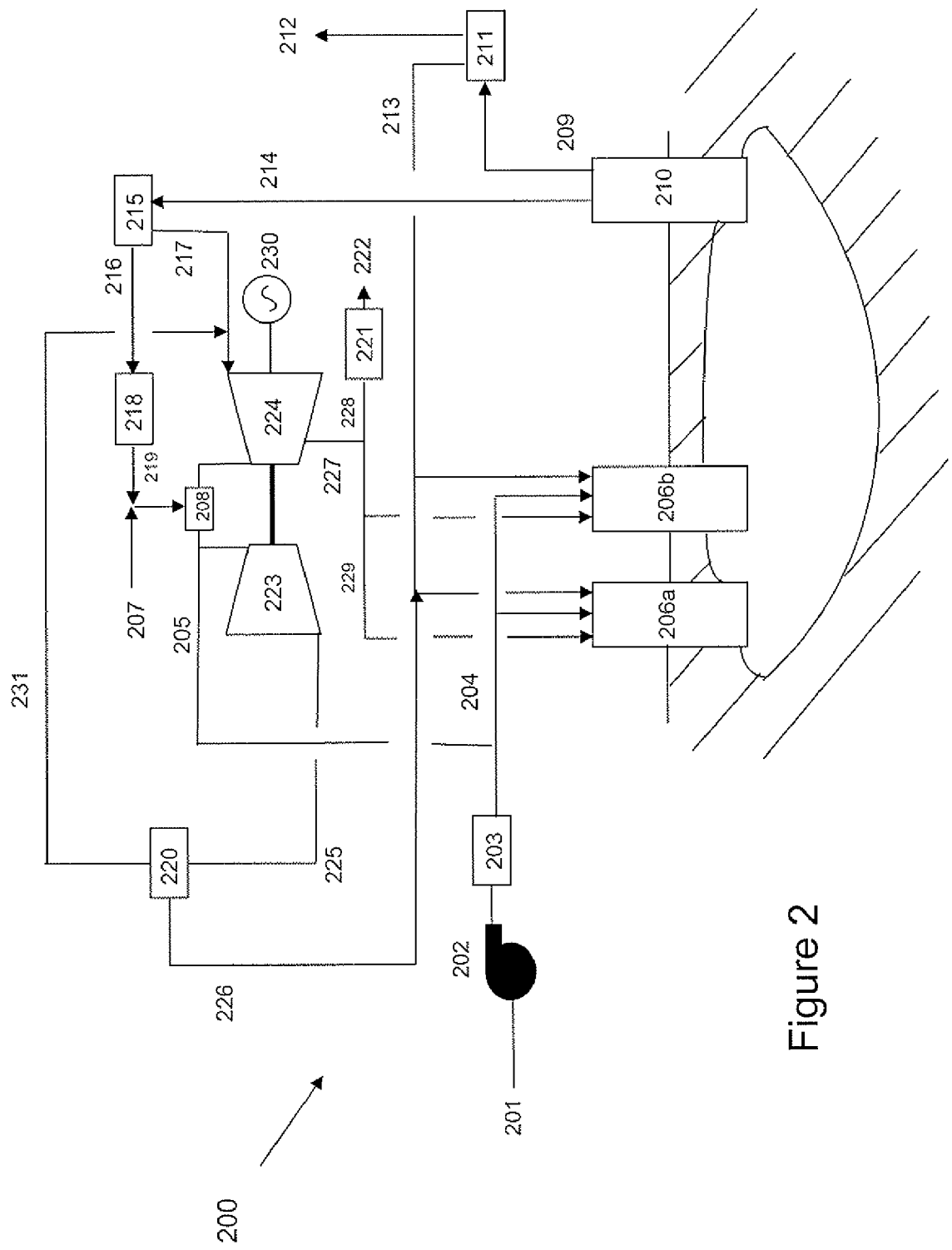
FIG. 2 is a schematic representation of another embodiment of the present invention with a combustion turbine for energy production.

Turning now to FIG. 2, enhanced oil recovery system 200 is provided. Essentially pure liquid oxygen stream 201 is introduced and increased in pressure in pump 202. The pressurized oxygen is vaporized in vaporizer 203. At least part of the oxygen is directed into stream 205 and introduced into combustion turbine combustor 208. The remaining pressurized and vaporized oxygen 204 is then injected into the oil reservoir through an injection well 206a/206b in order to support in-situ combustion. The pressure at which the vaporized oxygen is introduced into the reservoir may be between about 50% and about 80% of the breakdown pressure. Natural gas stream 207 is blended with high LHV fuel gas stream 218 (discussed below) and introduced into combustor 208.

A blended stream 209, containing at least oil, gas and water, is recovered from production well 210 This blended stream is separated in separator 211 thereby producing recovered oil stream 212, and separated water stream 213. Separated water stream 213 may be used as water injection into injection well 206a/206b. Recovered gas 214, which may include CO2, CO, H20, CH4, light hydrocarbons, H2, and H2S, is introduced to separator 215. The exact composition of the recovered gas will depend on the nature of the produced oil and the recovery process itself. The recovered gas will be substantially free of nitrogen, due to the oxygen injection. Separator 215 may include, but is not limited to, the following processes: adsorption, absorption, cryogenic systems and membrane systems. The adsorption systems may include, but are not limited to, Rectisol, Selexol, or Amine wash systems. In one embodiment, the membrane system or the combination of cryogenics and membrane system is preferred. A high LHV fuel gas 216, and a stream that is predominantly composed of CO2 217 are recovered from separator 215. The high LHV fuel gas 216 may optionally be further purified in gas purification unit 218. The purified high LHV gas 219 may be combined with natural gas stream 207, prior to admission to combustor 208.

After combusting the oxygen stream 205 with the fuel gas streams (207, 219), combustion turbine (Brayton cycle) (223, 208, 224) outputs power 230 to the process (compression) facility. The exhaust stream 225 that is predominantly H2O and CO2, impurities being SOx, NOx and Oxygen, exits expander 223. Exhaust stream 225 then enters separator 220, which outputs H20 stream 226 and CO2 stream 231 The H2O stream 226 is then combined with water stream 213 prior to admission into injection well 206a/206b.

Additives can be used in order to control PH Stream 226 CO2 stream 231 is then combined with stream 217, partially purified, and introduced into compressor 224. At least part of the compressed CO2 is admitted into injection well 206a/206b. If any CO2 remains, 228, it may be further purified in purifier 221, then sent to storage, to a local pipeline, or used for EOR 222.

The skilled artisan will recognize that the reinjected CO2 will improve in-situ combustion process by improving sweep efficiency. The present invention will also improve ultimate oil recovery (miscible/immiscible flooding will act in addition to in-situ combustion). The synergetic CO2 coinjection will reduce O2 needs and improve process economics. The CO2 will improve process safety by diluting O2 at the production well In one embodiment, at least a part of the CO2 228 is further purified 221 (to meet pipeline/use specification) and compressed to be exported for storage or can constitute a economically valuable gas supply to additional EOR-EGR-ECBM sites. The present invention also applies to feedstock such as heavy oil, bitumen, petcoke, kerogene, and coal. This process can also be applied to biomass or coal and petcoke used as feedstock of a liquid fuel production process.

What is claimed is:

1. An enhanced oil recovery method comprising:
   introducing a first essentially pure oxygen stream into a subterranean hydrocarbon-bearing formation traversed by at least one injection well and at least one production well, and initiating and sustaining in-situ combustion in the vicinity of said injection well thus allowing to upgrade and produce oil from the extraction well;
   providing a power generation system, wherein said power generation system comprises a combustion device, introducing a second essentially pure oxygen stream and a hydrocarbon-containing fuel gas stream into said combustion device, wherein said combustion device produces an exhaust gas stream comprising water and carbon dioxide,
   separating said exhaust gas stream into a stream of essentially pure water, and a stream of essentially pure carbon dioxide, and
   introducing at least a portion of said essentially pure carbon dioxide stream into said subterranean hydrocarbon-bearing formation during said in-situ combustion.

2. The enhanced oil recovery method of claim 1, further comprising removing an off-gas stream from said production well, wherein said off-gas stream comprises carbon dioxide and a high Lower Heating Value (LHV) fuel gas, and wherein said off-gas stream is separated into a second stream of essentially pure carbon dioxide, and a stream of high LHV fuel gas.

3. The enhanced oil recovery method of claim 2, wherein at least a portion of said second stream of essentially pure carbon dioxide is compressed and injected into the subterranean hydrocarbon-bearing formation during said in-situ combustion.

4. The enhanced oil recovery method of claim 1, wherein said power generation system comprises a Rankine cycle, wherein said Rankine cycle comprises a combustion device, a steam generation device, and a steam turbine generator.

5. The enhanced oil recovery method of claim 1, wherein said power generation system comprises a Brayton cycle, wherein said Brayton cycle comprises a combustion device, an expander, and a compressor.

* * * * *